Aug. 26, 1930.   R. S. BROWN   1,774,050
SPROCKET CENTER REMOVING MEANS

Original Filed Dec. 30, 1925

INVENTOR
Robert S. Brown
BY
Mitchell Bechert
ATTORNEYS.

Patented Aug. 26, 1930

1,774,050

UNITED STATES PATENT OFFICE

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT

SPROCKET-CENTER-REMOVING MEANS

Original application filed December 30, 1925, Serial No. 78,319. Divided and this application filed September 30, 1926. Serial No. 138,622.

My invention relates to a sprocket center or the like, and the present application is a division of my copending application, Serial No. 78,319, filed December 30, 1925, and patented March 26, 1929, Patent No. 1,706,650.

In mortising machines and the like, sprockets are usually held upon a shaft center removable from the driving shaft. When it is desired to employ a sprocket of different size, it is usual to remove the center and insert a new one, which latter carries the sprocket of the proper size. The usual sprocket centers have straight cylindrical shanks fitting in corresponding cylindrical bores in the driving shaft. In order to hold the center on the shaft, a relatively tight fit must be provided between the shaft and the sprocket center and after repeated withdrawals of such shanks, the cylindrical bore in the driving shaft is often worn and it is difficult to secure a tight fit. A loose fit, as will be clear, permits of a weaving action of the chain, which is detrimental to the operation of the machine.

It is the principal object of the present invention to provide an improved form of sprocket center device whereby a tight fit may be maintained even after repeated withdrawals of the sprocket center proper and in which the sprocket center will always be securely held.

It is a further object to improve certain details of construction in connection with a sprocket center, and to provide means facilitating removal of the sprocket center from the driving shaft.

In the drawings which show, for illustrative purposes, a preferred form of the invention—

Figure 1:
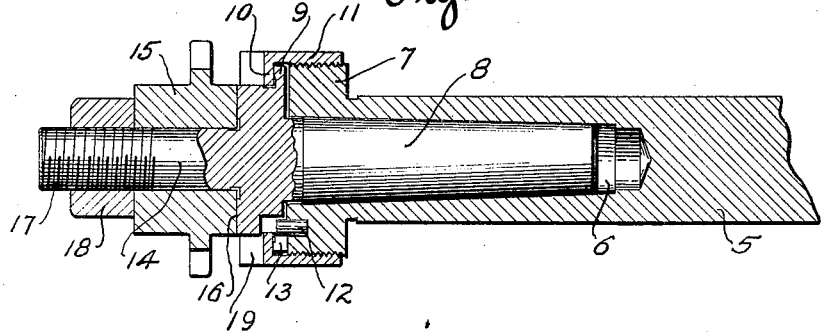
Fig. 1 is a longitudinal sectional view through part of a driving shaft and sprocket center device.
Figure 2:
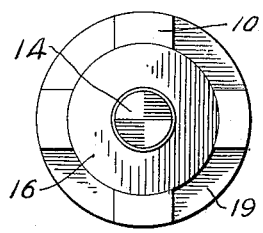
Fig. 2 is an end elevation of the sprocket center proper shown in Fig. 1.
Figure 3:
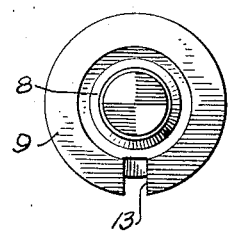
Fig. 3 is a view similar to Fig. 2 but viewed from the right in Fig. 1.
Figure 4:
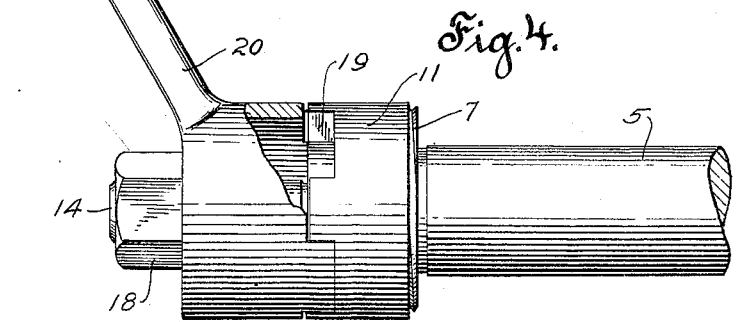
Fig. 4 is a view in partial section illustrating a method of removal of a sprocket center from a driving shaft.

In said drawings, 5 indicates a drive shaft having a longitudinally extending tapered bore 6 in its forward end. The forward end of the shaft 5 may have an annular boss 7 thereon threaded as indicated particularly in Fig. 1. The threads on this boss 7 are right-handed as indicated in Fig. 4. The sprocket center or the like is formed with a tapered shank 8 at its rear end adapted to fit the tapered bore 6. Intermediate the ends of the sprocket center is an annular flange 9 adapted to face the boss 7 and to provide engaging means for the retaining lip 10 on a union nut 11 threaded to screw onto the boss 7. It will be clear that when the union nut 11 is screwed up, the shank 8 will be forced into the tapered bore 6 and a very tight, secure fit will result. In order to further prevent rotation between the shank 8 and shaft 5, I may employ a key 12 projecting from the front face of the boss 7 and fitting in a notch or keyway 13 in the flange 9.

The forward end of the sprocket center may be turned down so as to provide a cylindrical portion or shank 14 for receiving a sprocket 15 or the like. One side of the sprocket engages an abutment face or shoulder 16, which may be a part of the flange 9. The forward end of the shank 14 is threaded as indicated at 17 for receiving the nut 18, which abuts the sprocket or the like 15 and holds the same in place on the sprocket center. The thread 17 is preferably left-handed for the purpose hereinafter described.

When it is desired to secure the sprocket center on the shaft 5, the shank 8 is placed in the bore 6 and the union nut 11 turned up so as to force the tapered shank 8 into tight engagement with the bore 6. The union nut 11 may be provided with spanner wrench receiving portions 19 as indicated.

Due to the very tight fit between the tapered shank 8 and its corresponding bore, it is difficult to remove the sprocket center from the shaft by the usual means. However, the sprocket center may be readily withdrawn as follows:

The nut 18 and sprocket 15 are removed and a backing off device preferably in the form of a spanner wrench 20, having a cup shaped end with engaging lugs, is slipped over the shank 14 and engaged with the notches 19 of the union nut as indicated particularly in Fig. 4. The nut 18 is then turned up on the shank 17 and against the bottom of the cup shaped portion on the device 20. Now, when the device 20 is turned counter-clockwise, the union nut 11 will be unscrewed and in unscrewing moves toward the left, as viewed in Fig. 4. This movement is resisted by the nut 18 carried on the sprocket center, which nut cannot be unscrewed by the part 20, due to its left-hand thread, and therefore continued rotation of the device 20 unseats and withdraws the tapered shank from its bore 6. Due to the tapered construction, it is only the initial frictional resistance between the shank 8 and its bore which needs to be overcome, and after the shank 8 has been loosened, the nut 11 may be very easily unscrewed and the shaft center removed.

A specific form of the invention has been herein disclosed, but I do not wish to be strictly limited to the details shown since obviously changes may be made within the scope of the invention as defined in the appended claims.

I claim:

1. In a device of the character described, a center having a tapered shank at its rear end to fit in the tapered bore of a support, a union nut mounted on the center and internally threaded to engage said support, a shank at the outer end of said center having a thread thereon of the opposite hand to the thread within said union nut, a nut thereon, a center unseating and removing device mounted and rotatable on said shank between said nut and said union nut, with means for detachably engaging said device with said union nut whereby the rotation of said device on said shank will rotate said union nut in a direction to disengage the tapered shank from said support.

2. In a device of the character described, a rotatable support having a tapered bore, a center having a tapered shank at its rear end fitting in the tapered bore of said support, a boss on said support having screw threads formed thereon, a union nut mounted on said support engaging over a flange on said center and engaging the threads on said boss, wrench engaging recesses in the forward face of said union nut, a forwardly extending shank on said center, and threads on said forwardly extending shank of opposite hand from the threads on said boss.

ROBERT S. BROWN.